(12) United States Patent
Chau et al.

(10) Patent No.: US 6,714,169 B1
(45) Date of Patent: Mar. 30, 2004

(54) COMPACT, WIDE-BAND, INTEGRATED ACTIVE MODULE FOR RADAR AND COMMUNICATION SYSTEMS

(75) Inventors: Loc B. Chau, Canoga Park, CA (US); Kuan M. Lee, Brea, CA (US); John S. Williams, Palos Verdes Estates, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/309,497

(22) Filed: Dec. 4, 2002

(51) Int. Cl.[7] .................................................. H01Q 3/24
(52) U.S. Cl. ............................ 343/876; 343/700 MS; 333/262
(58) Field of Search ........................ 343/700 MS, 771, 343/876; 257/80, 84, 189; 333/151, 262; H01Q 1/36, 1/38, 3/24

(56) References Cited

U.S. PATENT DOCUMENTS

| | | |
|---|---|---|
| 5,578,976 A | 11/1996 | Yao |
| 6,046,659 A | 4/2000 | Loo et al. |
| 6,114,997 A | 9/2000 | Lee et al. |
| 6,331,257 B1 | 12/2001 | Loo et al. |
| 6,391,675 B1 | 5/2002 | Ehmke et al. |
| 6,392,610 B1 * | 5/2002 | Braun et al. ................. 343/876 |
| 6,410,941 B1 * | 6/2002 | Taylor et al. .................. 257/84 |
| 6,462,360 B1 * | 10/2002 | Higgins et al. ............. 257/189 |
| 6,589,856 B2 * | 7/2003 | Curless ........................ 438/479 |
| 6,633,260 B2 * | 10/2003 | Paschen et al. ....... 343/700 MS |
| 6,642,889 B1 * | 11/2003 | McGrath ............. 343/700 MS |

* cited by examiner

*Primary Examiner*—Tho Phan
(74) *Attorney, Agent, or Firm*—Leonard A. Alkov; Glenn H. Lenzen, Jr.

(57) ABSTRACT

An integrated module for an active antenna assembly is disclosed. The integrated module is switchable between a receive mode and a transmit mode and includes active components and a dual input wideband balun. The active components includes amplifiers and micro electro-mechanical system (MEMS) switches. The integrated module is adapted for positioning directly behind a radiator of an antenna array.

24 Claims, 4 Drawing Sheets

COMPACT, WIDE-BAND, INTEGRATED ACTIVE MODULE FOR RADAR AND COMMUNICATION SYSTEMS

TECHNICAL FIELD

The present invention generally relates to an integrated active module for use in radio frequency (RF) systems and, more particularly to an integrated active module that can include an assembly having a wide-band balun, amplifiers and micro-electro-mechanical systems (MEMS) switches arranged with a radiator so as to couple RF energy from a transmitter and/or to a receiver.

BACKGROUND

A wide variety of antennas are used to transmit and/or receive signals (e.g., RF signals) at microwave and/or millimeterwave frequencies. Often, the antennas are formed from a plurality of radiators. Each radiator can be associated with a transmitter used to generate signals to be transmitted by the antenna and a receiver used to process signals received by the antenna. Many transmit/receive (TR) modules are provided with an amplifier for the transmit path and an amplifier for the receive path.

The TR module can include switches that are used to select which of the transmitter or the receiver is coupled to the radiator. In the past, the switches have been implemented with PIN diodes, gallium arsenide (GaAs) field effect transistors (FETs), latching circulators and electromechanical devices such as relays.

Circuit loss is an inherent problem in RF transceiver circuits that can degrade system performance. Contributing factors to circuit loss include, for example, conductor loss, dielectric material loss and so forth. Prior attempts to compensate for circuit loss and improve system performance have included providing additional signal gain with the TR module amplifiers. However, providing additional gain in the TR module amplifiers can result in increasing the size and power consumption of the TR module. In addition, heat dissipation problems can arise when higher gain amplifiers are employed.

Location of the TR module with respect to the radiator is also a concern since loss will increase with increased length of the conductors coupling the TR module and the radiator. The size of the TR module components contribute to the placement of the TR module. That is, the larger the TR module, the further the TR module may have to be placed from the radiator to accommodate each TR module for a multiple radiator antenna.

Accordingly, there exists a need in the art for higher performance integrated radiator/TR modules with compact size for use in RF applications.

SUMMARY OF THE INVENTION

According to one aspect of the invention, the invention is directed to an integrated module for an active antenna radiator assembly, the integrated module switchable between a receive mode and a transmit mode. The integrated module can include a first amplifier to amplify signals to be transmitted by the radiator, a second amplifier to amplify signals received by the radiator, a dual input wideband balun, a transmit line coupled to an output of the first amplifier and the balun, a receive line coupled to an input of the second amplifier and the balun, a first MEMS switch to shunt the receive line to ground when the integrated module is placed in the transmit mode and a second MEMS switch to shunt the transmit line to ground when the integrated module is placed in the receive mode.

According to another aspect of the invention, the invention is directed to an active antenna radiator assembly. The assembly can include a radiator and an integrated module disposed behind the radiator and switchable between a receive mode and a transmit mode. The integrated module can include a high power amplifier (HPA) for amplifying signals to be transmitted by the radiator; a low noise amplifier (LNA) for amplifying signals received by the radiator; a wideband balun having at least a first arm and a second arm, the arms respectively coupled to the radiator via a pair of probes that are 180 degrees out of phase with respect to the radiator; a receive line coupled to an input of the LNA and the balun; a transmit line coupled to an output of the HPA and the balun; a receive micro electromechanical system (MEMS) switch to selectively couple the receive line to ground when the integrated module is placed in the transmit mode; and a transmit MEMS switch to selectively couple the transmit line to ground when the integrated module is placed in the receive mode.

BRIEF DESCRIPTION OF DRAWINGS

These and further features of the present invention will be apparent with reference to the following description and drawings, wherein.

DISCLOSURE OF INVENTION

Figure 1:
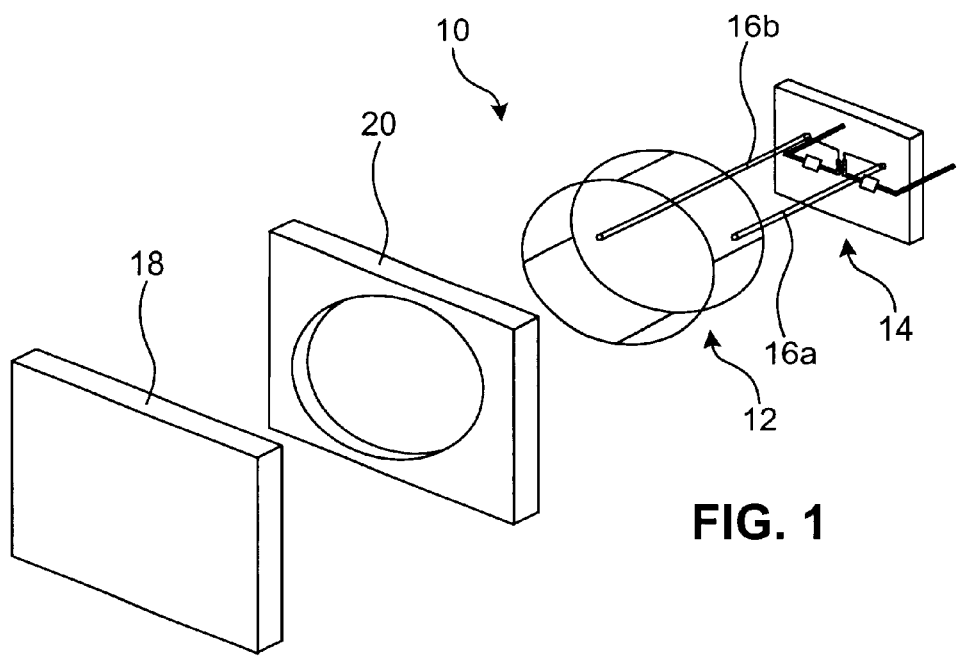
FIG. 1 is an exploded view of an antenna radiator assembly that includes an antenna radiator and an integrated module according to the present invention.

In the detailed description that follows, similar components have been given the same reference numerals, regardless of whether they are shown in different embodiments of the present invention. To illustrate the present invention in a clear and concise manner, the drawings may not necessarily be to scale and certain features may be shown in somewhat schematic form.

Certain features of the invention are directed to an integrated module for an active antenna radiator assembly. The integrated module is switchable between a receive mode and a transmit mode and includes a first amplifier to amplify signals to be transmitted by the radiator, a second amplifier to amplify signals received by the radiator, a dual input wideband balun, a transmit line to direct output signals of the first amplifier, a receive line to direct input signals to the input of the second amplifier, a first MEMS switch to shunt the receive microstrip line to ground when the integrated module is placed in the transmit mode and a second MEMS switch to shunt the transmit strip line to ground when the integrated module is placed in the receive mode.

Certain other features of the invention are directed to an integrated module for an active antenna radiator assembly. The assembly includes a radiator, a balun, amplifiers and MEMS switches module disposed behind the radiator. The module is switchable between a receive mode and a transmit mode and includes: a high power amplifier (HPA) for amplifying signals to be transmitted by the radiator; a low noise amplifier (LNA) for amplifying signals received by the radiator; and a wideband balun having a receive path and a transmit path. Received signals from the radiator are coupled to the balun via a pair of probes that are 180 degrees out of phase. The balun combines, resonates and couples the signals to a receive line that directs energy to an input of the LNA. A transmit line couples energy from an output of the HPA to the balun where the energy (in the form of a signal to be transmitted) is split into two signals that are 180 degrees out of phase. The two 180 degree out of phase signals are, in turn, fed to the radiator via the probes. A receive micro electromechanical system (MEMS) switch selectively couples the receive line and receive path of the balun to ground when the integrated module is placed in the transmit mode; and a transmit MEMS switch to selectively couple the transmit line and transmit path of the balun to ground when the integrated module is placed in the receive mode.

Referring initially to FIG. 1, shown is an exploded view of an integrated active antenna radiator assembly 10. The radiator assembly 10 includes a radiator 12 and an integrated module 14. It should be appreciated that a plurality of the radiator assemblies 10 can be used in conjunction with one another to form an array antenna for use in applications such as scanning, communications, etc. In the illustrated embodiment, the radiator 12 is a wideband, widescan, low profile, multi-layer, high dielectric, circular (or cylindrical) radiator. In one embodiment, the radiator 12 can be an X-band radiator and, in another embodiment, the radiator can a dual frequency radiator (e.g., X-band and C-band). The illustrated radiator 12 in FIG. 1 has linear polarization where an input probe 16a is 180 degrees out of phase from another probe 16b. The present invention is not limited to the foregoing radiator 12 and other types of radiators can be used as part of the radiator assembly 10, such as, for example, spiral radiators and vivaldi radiators. In one embodiment, the radiator 12 is a circular patch printed onto a dielectric cylinder.

The integrated module 14 is located directly behind the radiator 12. Such an arrangement increases the proximity of the integrated module 14 to the radiator 12. Therefore, the length of the conductors used to couple the integrated module 14 to the radiator 12 can be kept to a minimum and conductor loss can be minimized. The integrated module 14 also includes amplifiers for the receive and transmit paths. The integrated module 14 also includes a wideband, dual input balun. In the illustrated embodiment, the radiator 12 is coupled to outputs of the integrated module 14 with the pair of probes 16. A radome 18 and dielectric layer 20 can be positioned over the radiator 12 as is conventional. In one embodiment, a parasitic patch (not illustrated) to increase bandwidth is provided between the radiator 12 and the dielectric layer 20.

Figure 2:
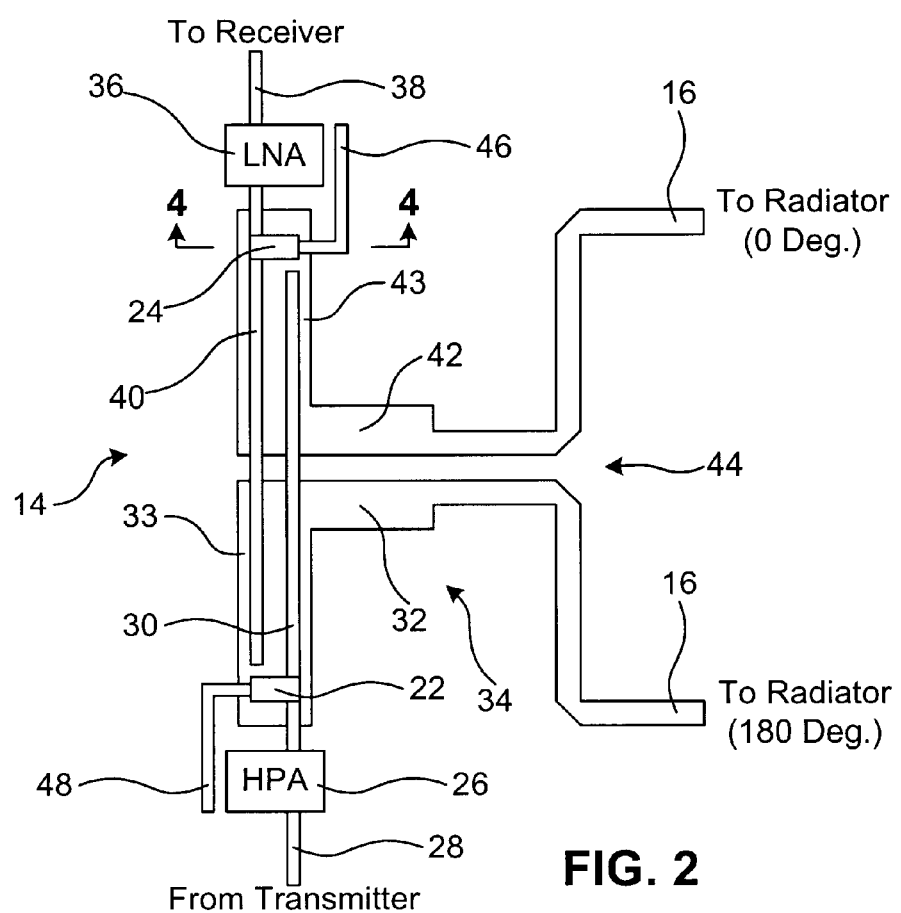
FIG. 2 is a schematic representation of a first embodiment of the integrated module.

Turning to FIG. 2, a first embodiment of the integrated module 14 is illustrated. In order to place the integrated module 14 directly behind the radiator 12, the size of the integrated module 14 is a concern. As will be described in greater detail below, the integrated module 14 uses micro electromechanical system (MEMS) switches to achieve a compact, integrated module 14 arrangement. More specifically, the integrated module 14 integrates MEMS switches and other active devices (e.g., amplifiers) with a balun to achieve a compact, multi-layer microwave circuit.

The integrated module 14 includes a first MEMS switch used in conjunction with coupling a transmitter (not shown) to the radiator 12. This MEMS switch will be referred to herein as a transmit MEMS switch 22. The integrated module 14 also includes a second MEMS switch used in conjunction with coupling a receiver (not shown) to the radiator 12. This MEMS switch will be referred to herein as a receive MEMS switch 24.

The integrated module 14 includes a high power amplifier (HPA) 26 that is coupled to receive and amplify signals produced by the transmitter before the signals are connected to the radiator 12 for transmission. Connection between the HPA 26 and the transmitter can be accomplished, for example, by way of a microstrip line 28. An output of the HPA 26 is coupled to a transmit microstrip line 30. As will be explained in greater detail below, the transmit microstrip line 30 can be considered part of a transmit path used to couple the outgoing signal to a wideband balun 34. The balun 34 includes a first pair of arms 32 and 33 and a second pair of arms 42 and 43. The arms 32 of the balun 34 is connected to one of the probes 16 and the arm 42 of the balun 34 is connected to the other one of the probes 16.

The integrated module 14 also includes a low noise amplifier (LNA) 36 that is coupled to receive and amplify signals received by the radiator 12 before the signals are connected to the receiver for additional processing. Connection between the LNA 36 and the receiver can be accomplished, for example, by way of a microstrip line 38. An input of the LNA 36 is coupled to a receive microstrip line 40. As will be explained in greater detail below, the receive microstrip line 40 can be considered part of a receive path used to couple the incoming signal from the balun 34 to the LNA 36.

The integration of the active devices (the MEMS switches 22, 24, the HPA 26 and the LNA 36) and the balun 34 as well as placing the integrated module 14 directly behind the radiator 12, improves system performance over conventional designs. Namely, circuit loss can be minimized and gain from the LNA 36 and the HPA 26 contribute to enhanced performance.

As indicated, the balun 34 includes a first pair of interconnected arms 32, 33 and a second pair of interconnected arms 42, 43. The pairs of arms 32/33 and 42/43 form oppositely arranged "L" shaped structures. A slot 44 separates the pairs of arms 32/33 and 42/43. In the illustrated embodiment, each arm 32, 33, 42 and 43 of the balun 34 are quarter wavelength (1/4λ) sections. An output of the arm 42 is coupled to the radiator 12 via one of probes 16 at a position that is 180 degrees out of phase from the coupling of the arm 32 to the radiator 12 by the other of the probes 16.

The transmit microstrip line 30 and the receive microstrip line 40 are disposed over the balun 34. In the illustrated embodiment, the transmit microstrip line 30 extends from the transmit MEMS switch 22 towards the receive MEMS switch 24 and the receive microstrip line 40 extends from the receive MEMS switch 24 towards the transmit MEMS switch 22. The transmit microstrip line 30 and the receive microstrip line 40 can be separate by a few linewidths.

In the illustrated embodiment, the transmit microstrip line 30 is electrically coupled to the arms 33 and 43 of the balun 34. Extending from the transmit MEMS switch 22, the transmit microstrip line 30 is disposed over and separated from the arm 33 of the balun 34. Continuing along the longitudinal axis of the transmit microstrip line 30, the transmit microstrip line 30 is disposed over and separated from the arm 43 of the balun 34. The length of the transmit microstrip line 30 measured from the center of the slot 44 to an end of the transmit microstrip line 30 distal the transmit MEMS switch 22 (i.e., the end disposed over the arm 43 of the balun 34) is a quarter wavelength (i.e., 1/4λ) for the establishment of a standing wave resonator when the integrated module 14 is placed in a receive mode as described in greater detail below. The length of the transmit microstrip line 30 from the slot 44 to the transmit MEMS switch 22 is less significant to the operation of the integrated module 14.

Similarly, the receive microstrip line 40 is electrically coupled to the arms 43 and 33 of the balun 34. Extending from the receive MEMS switch 24, the receive microstrip line 40 is disposed over and separated from the arm 43 of the balun 34. Continuing along the longitudinal axis of the receive microstrip line 40, the receive microstrip line 40 is disposed over and separated from the arm 33 of the balun 34. The length of the receive microstrip line 40 measured from the center of the slot 44 to an end of the receive microstrip line 40 distal the receive MEMS switch 24 (i.e., the end disposed over the arm 33 of the balun 34) is a quarter wavelength (i.e., 1/4λ) for the establishment of a standing wave resonator when the integrated module 14 is placed in a transmit mode as described in greater detail below. The length of the receive microstrip line 40 from the slot 44 to the receive MEMS switch 24 is less significant to the operation of the integrated module 14.

In operation, the integrated module 14 can be placed in a transmit mode and a receive mode. In the transmit mode, the integrated module 14 couples signals generated by the transmitter to the radiator 12 and shunts the receive path to a ground line 46. As will be described in greater detail below, the shunt is established by actuation of the receive MEMS switch 24. The shunting the balun 34 and the receive microstrip line 40 to the ground line 46 forms a virtual short at the switch 24 for the receive path (i.e., the conduction path from the radiator 12 to the receiver) allowing maximum energy transfer through the balun 34 along the transmit path (i.e., the conduction path from the transmitter to the radiator 12).

In the receive mode, the integrated module 14 couples signals received by the radiator 12 to the receiver and shunts the transmit path to a ground line 48. As will be described in greater detail below, the shunt is established by actuation of the transmit EMS switch 22. The shunting the balun 34 and the transmit microstrip line 30 to the ground line 48 forms a virtual short at the switch 22 for the transmit path allowing maximum energy transfer through the balun 34 along the receive path.

In addition to the foregoing operation of the integrated module 14, shunting the receive microstrip line 40 to the ground line 46 during transmission protects (e.g., isolates) the LNA 36 from transmit signals. Similarly, shunting the transmit microstrip line 30 to the ground line 48 during reception protects (e.g., isolates) the HPA 26 from received signals.

The receive MEMS switch 24 and the transmit MEMS switch 22 function together as a single pole, double throw (SPDT) switch. When the integrated module 14 is placed in the transmit mode, the receive MEMS switch 24 functions as an isolator to block incoming signals (e.g., a jamming signal or a countermeasure).

Figure 3:
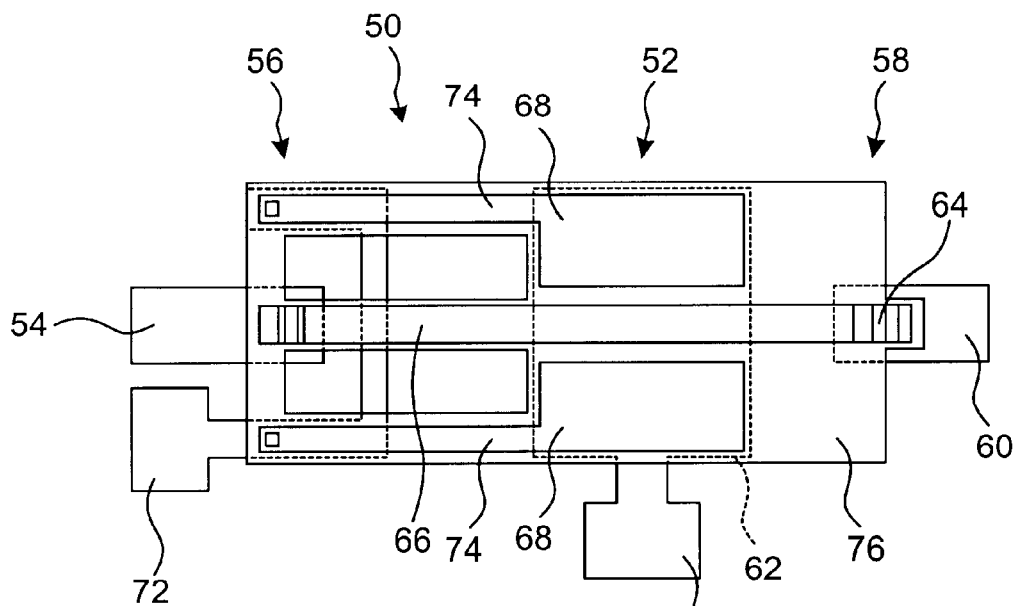
FIG. 3 is a block diagram of an exemplary micro electromechanical system (MEMS) switching unit suitable for use as part of the integrated module of FIG. 2.
Figure 4A:
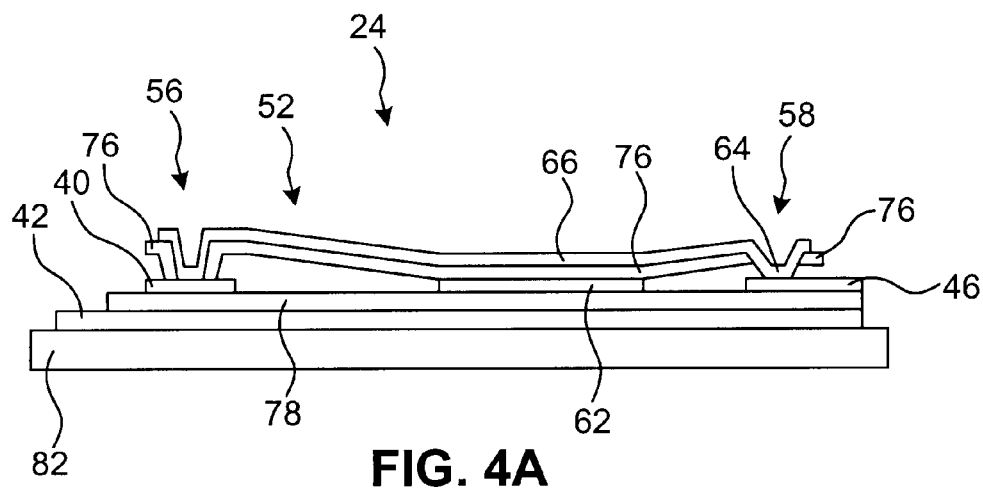
FIG. 4A is a cross-section of a MEMS switch configured for use in the integrated module of FIG. 2 in a closed position and taken along the line 4—4 of FIG. 2.
Figure 4B:
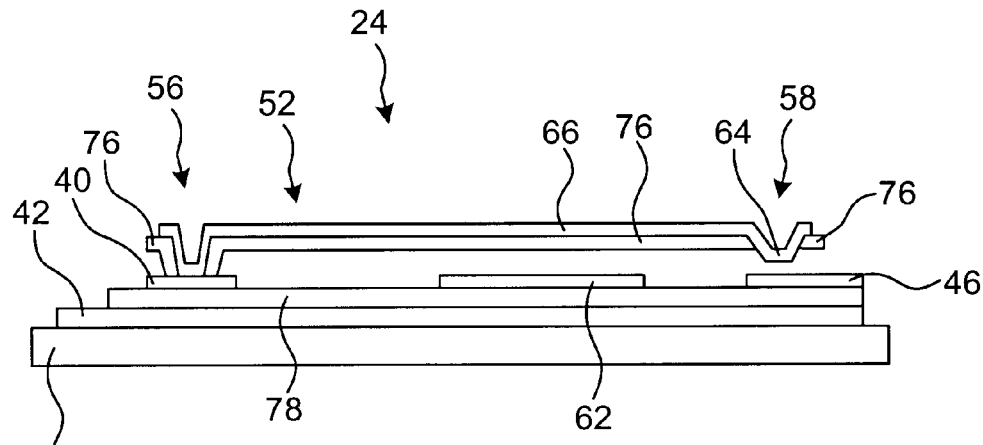
FIG. 4B is a cross-section of the MEMS switch configured for use in the integrated module of FIG. 2 in an open position and taken along the line 4—4 of FIG. 2.

Referring now to FIG. 3, a block diagram of an exemplary MEMS switching unit 50 that could be used as the transmit MEMS switch 22 and/or the receive MEMS switch 24 of the integrated module 14 is illustrated. It is noted that the arrangement of the connection pads and conductive members illustrated in FIG. 3 may be modified for use in the integrated module 14. FIGS. 4A and 4B illustrated a cross-section of the receive MEMS switch 24 that is fabricated using the general arrangement of the MEMS switching unit 50, but configured for use in the integrated module 14. In the illustrated embodiment, a cross-section of the transmit MEMS switch 22 would generally be a mirror image of the cross-section of the receive MEMS switch 24. Therefore, the transmit MEMS switch 22 will not be separately illustrated. It is noted that the cross-section section of FIG. 4A illustrates the receive MEMS switch 24 in a closed position (also referred to as an on state for generating the shunt described above) and the cross-section of FIG. 4B illustrates the receive MEMS switch 24 in an open position (also referred to as an off state).

In the first embodiment of the integrated module 14, the MEMS switches 22 and 24 can be implemented with shunt cantilever MEMS switches, such as the MEMS switching unit 50. Although features and characteristics of the MEMS switching unit 50 will be described below, additional details of a suitable switching unit can be found in U.S. Pat. No. 6,046,659, the disclosure of which is herein incorporated by reference in its entirety.

The MEMS switching unit 50 can be viewed as a single pole, single throw (SPST) switch device. More particularly, the MEMS switching unit 50 can be implemented with a MEMS switch that interrupts signal transmission by shunting (or "shorting") a signal conduction path to ground.

The switching unit 50 includes an armature 52 affixed to a first signal transmission line 54 at a proximal end 56 of the armature 52. A distal end (or contact end 58) of the armature 52 is positioned over a second signal transmission line 60. A substrate bias electrode 62 can be disposed under the armature 52 and, when the armature 52 is in the open position, the armature 52 is spaced from the substrate bias electrode 62 and the second transmission line 60 by an air gap.

A conducting dimple, or contact 64, protrudes downward from the contact end 58 of the armature 52 such that in the closed position the contact 64 contacts the second signal transmission line 60. The contact 64 is electrically connected by a conducting transmission line 66 to the first signal transmission line 54 so that when the armature 52 is in the closed position, the first signal transmission line 54 and the second signal transmission line 60 are electrically coupled to one another by a conduction path. Signals can then pass from the first signal transmission line 54 to the second signal transmission line 60 (or vice versa) via the MEMS switching unit 50. When the armature 52 is in the open position, the first signal transmission line 54 and the second signal transmission line 60 are electrically isolated from one another.

Above the substrate bias electrode 62, the armature 52 is provided with a armature bias electrode 68 (noting that the armature bias electrode 68 may have multiple segments on either side of the transmission line 66 as illustrated or may have a portion disposed under the transmission line 66 and separated therefrom by an insulating layer). The substrate bias electrode 62 is electrically coupled to a substrate bias pad 70. The armature bias electrode 68 (and portions thereof) is electrically coupled to an armature bias pad 72 via at least one armature conductor 74. When a suitable voltage potential is applied between the substrate bias pad 70 and the armature bias pad 72, the armature bias electrode 68 is attracted to the substrate bias electrode 62 to actuate the MEMS switching unit 50 from the open position (e.g., as illustrated in FIG. 4B) to the closed position (e.g., as illustrated in FIG. 4A).

The armature 52 can include structural members 76 for supporting components such as the contact 64, transmission line 66, bias electrode 68 and conductor 74. It is noted that the contact 64 and transmission line 66 can be formed from the same layer of material or from different material layers.

As best illustrated in FIGS. 4A and 4B, when the MEMS switching unit 50 is used in the integrated module 14 as the MEMS switches 22 and 24, the first signal transmission line 54 is implemented as the microstrip lines (the receive microstrip line 40 for the receive MEMS switch 24 and the transmit microstrip line 30 for the transmit MEMS switch 22). Similarly, the second transmission line 60 is implemented as the ground lines (the ground line 46 for the receive MEMS switch 24 and the ground line 48 for the transmit MEMS switch 22). Accordingly, when the armature 52 of the transmit MEMS switch 22 or the receive MEMS switch 24 is in the closed position, the microstrip line 30 or 40 is shunted to the respective ground line 48 or 46. When the armature 52 of the transmit MEMS switch 22 or the receive MEMS switch 24 is in the open position, the microstrip line 30 or 40 is isolated from the respective ground line 48 or 46.

With continued reference to FIGS. 4A and 4B, the receive MEMS switch 24 is shown respectively in the closed position (e.g., when the integrated module 14 is in the transmission mode) and in the open position (e.g., when the integrated module 14 is in the receive mode). The receive microstrip line 40 is disposed over and separated from the arms 43 and 33 of the balun 34. An insulating layer 78 isolates the receive microstrip line 40 from the arms 43 and 33. The transmit MEMS switch 22 is similarly arranged with the transmit microstrip line 30 and the arms 33 and 43. The foregoing structures (e.g., balun 34, microstrip lines 30 and 40, MEMS switches 22 and 24, HPA 26 and LNA 36) can be disposed on a substrate 82.

A controller (not shown) can be used to apply appropriate signals to the armature bias pad 72 and the substrate bias pad 70 of both of the transmit MEMS switch 22 and the receive MEMS switch 24 so as to place the integrated module 14 in the receive or transmit modes. In one embodiment, the controller can be a digital microprocessor.

Figure 5:
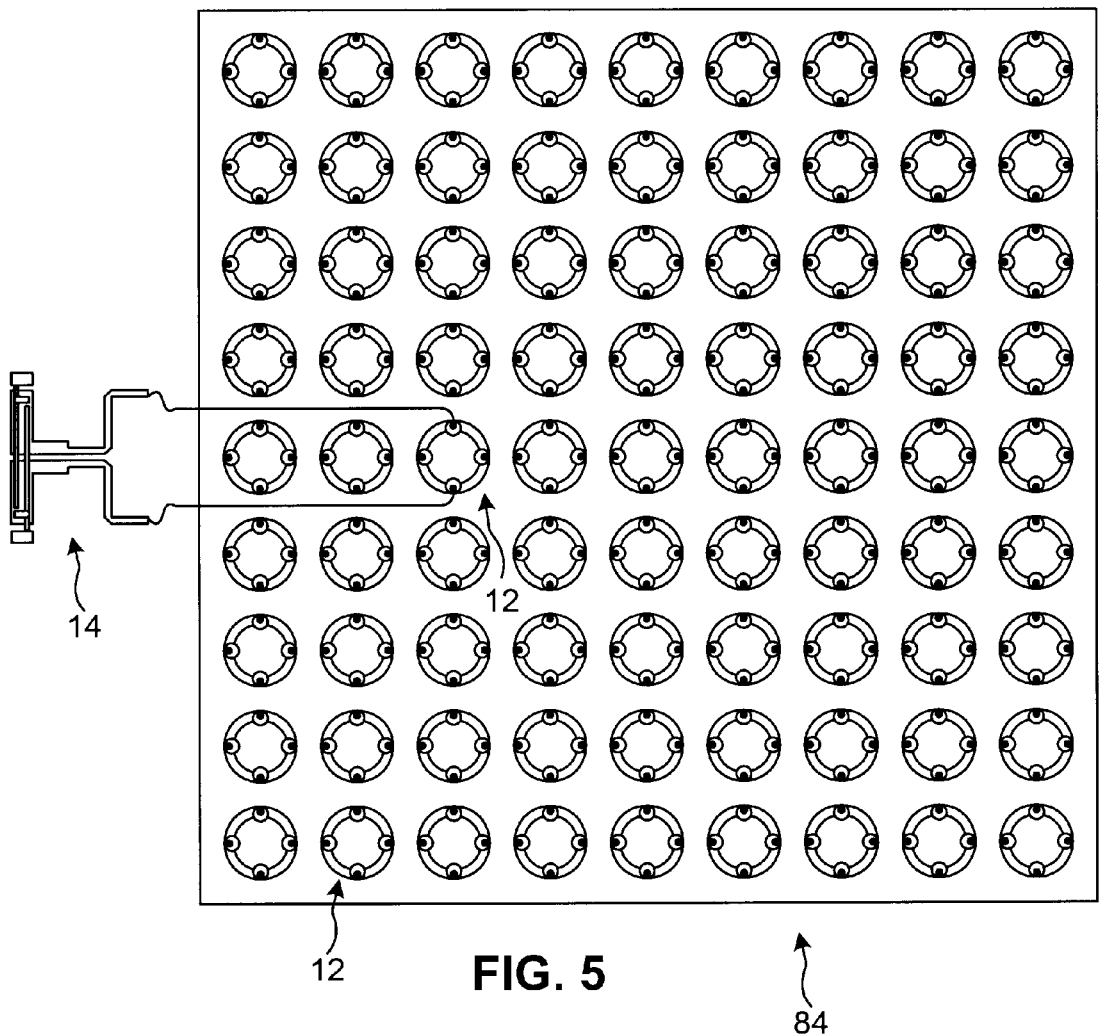
FIG. 5 is an exemplary antenna array that includes a matrix of antenna radiator assemblies according to the present invention.

Referring now to FIG. 5, shown is an exemplary antenna array 84 comprised of a nine by nine matrix of antenna radiators 12. It should be understood that the present invention is applicable other sized antenna arrays, such as a phase array antenna with a large number of radiating elements. For example, by proper excitation of input ports of the radiating elements, a dual-linear polarization antenna or a dual-circular polarization antenna can be obtained.

Disposed behind each antenna radiator 12 of the antenna array 84 is an integrated module 14 to form an antenna radiator assembly 10 (FIG. 1). To clearly illustrate the antenna array 84, only one integrated module 14 is illustrated. In addition, the integrated module 14 is illustrated as being to the side of the antenna array 84. However, as described herein and as better illustrated in FIG. 1, the integrated module 14 can be placed directly behind the radiator 12 to minimize the length of the conductors coupling the integrated module 14 and the radiator 12.

Figure 6:
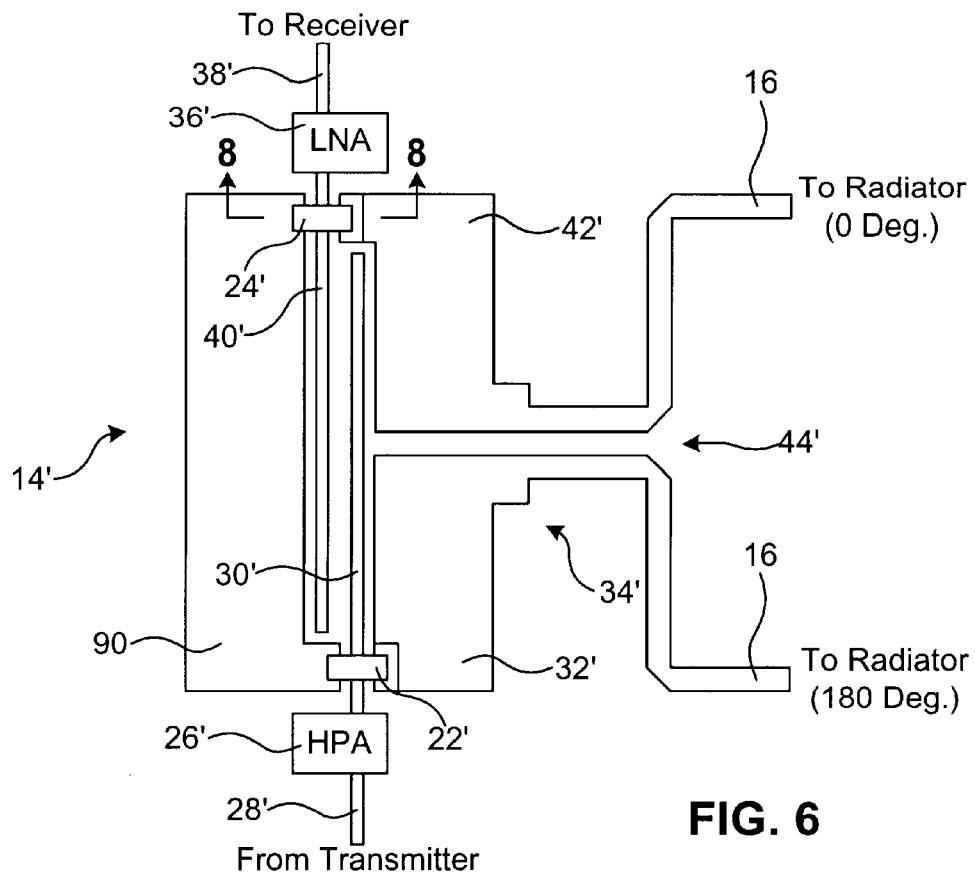
FIG. 6 is a schematic representation of a second embodiment of the integrated module.

Referring now to FIG. 6, shown is a second embodiment of the integrated module 14'. Operationally, the second embodiment of the integrated module 14' functions in the same manner as the first embodiment of the integrated module 14 and is sized for placement directly behind the radiator 12.

Similar to the integrated module 14, the integrated module 14' includes a balun 34' having an arm 32' and an arm 42' that are oppositely arranged and separated by a slot 44'. However, in the integrated module 14', the balun 34' is arranged as a co-planar wave guide (CPW). The integrated module 14' also includes an HPA 26' electrically connected to the transmitter by way of a conductor 28' and an LNA 36' connected to the receiver by way of a conductor 38'. The output of the HPA 26' and the output of the LAN 36' are respectively connected to a transmit CPW line 30' and a receive CPW line 40'. The transmit CPW line 30' and the receive CPW line 40' can respectively be considered portions of a transmit path and a receive path.

The transmit CPW line 30' and the receive CPW line 40' are electrically coupled to the balun 34'. In the illustrated embodiment, the transmit strip line 30', the receive strip line 40' and the balun 34' are disposed in the same plane. The transmit and receive MEMS switches 22' and 24' in the second embodiment of the integrated module 14' are capacitive membrane MEMS switches. A suitable capacitive membrane MEMS switch for use as the transmit MEMS switch 22' and/or the receive MEMS switch 24' is described in greater detail in U.S. Pat. No. 6,391,675, the disclosure of which is herein incorporated by reference in its entirety.

Figure 7:
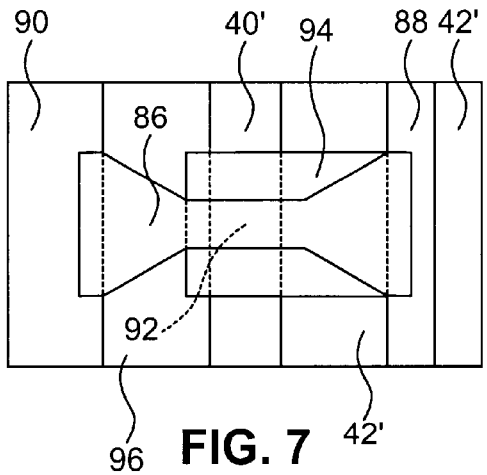
FIG. 7 a block diagram of an exemplary MEMS switching unit suitable for use as part of the integrated module of FIG. 6.
Figure 8A:
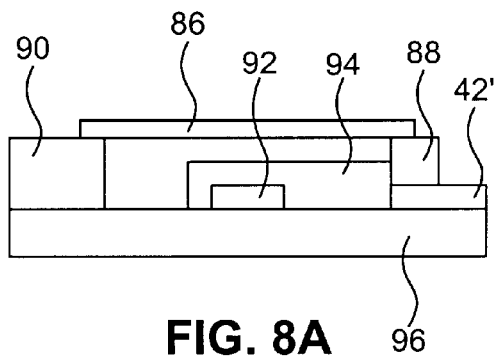
FIG. 8A is a cross-section of a MEMS switch configured for use in the integrated module of FIG. 6 in a closed position and taken along the line 8—8 of FIG. 6.
Figure 8B:
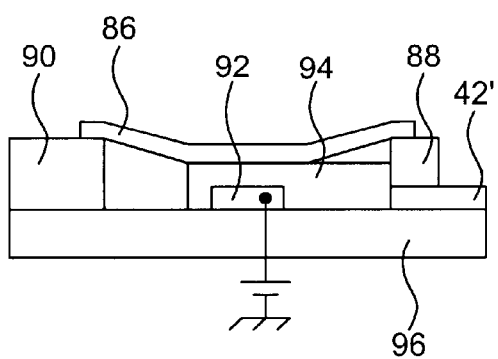
FIG. 8B is a cross-section of the MEMS switch configured for use in the integrated module of FIG. 6 in an open position and taken along the line 8—8 of FIG. 6.

With additional reference to FIGS. 7, 8A and 8B, the receive MEMS switch 24' and its connections to the receive CPW line 40' and arm 42' is illustrated in greater detail. As should be apparent to one skilled in the art, a similar configuration is used for the transmit MEMS switch 22', the transmit CPW line 30' and the arm 32' of the balun 34'. Therefore, the transmit MEMS switch 22' will not be separately illustrated.

The receive MEMS switch 24' includes a conductive membrane 86 that is spanned between a non-conductive post 88 disposed on the arm 42' of the balun 34' and a bias pad 90. Disposed under the membrane 86 is an electrode 92 that forms a part of the receive CPW line 40' (alternatively, the electrode 92 is separate from the MEMS CPW line 40' but is connected to the receive strip line 40). Overlying the electrode 92 is a dielectric layer 94. As illustrated, the foregoing structure is formed on a substrate 96.

The bias pad 90, and hence the membrane 86, are connected to a reference voltage, such as ground. In an off state of the receive MEMS switch 24' (e.g., as illustrated in FIG. 8A), an air gap exists between the membrane 86 and the dielectric layer 94. If a DC bias voltage is applied to the electrode 92 to create a voltage differential between the membrane 86 and the electrode 92, the receive MEMS switch 24' will toggle to an on state (e.g., as illustrated in FIG. 8B) where the membrane 86 is deflected downward until the membrane 86 rests on the dielectric layer 94. This contact forms a capacitive coupling that effectively shorts, or shunts, high frequency signals from the receive CPW line 40' and the arm 42' of the balun 34' to the membrane 86 and, in the illustrated embodiment, to ground.

In the transmit mode, the transmit MEMS switch 22' is placed in an off state to allow signals generated by the transmitter to be coupled to the radiator 12 and the receive MEMS switch 24' is place in an on state to shunt the receive CPW line 40' and the arm 42' of the balun 34' to ground. In the receive mode, the transmit MEMS switch 22' is placed in an on state to shunt the transmit CPW line 30' and the arm 32' of the balun 34' to ground and the receive MEMS switch 24' is placed in an off state to allow signals received by the radiator 12 to be coupled to the receiver.

A controller, not shown, can be used to apply appropriate signals to the electrode 92 of both of the transmit MEMS switch 22' and the receive MEMS switch 24' so as to place the integrated module 14' in the receive or transmit modes.

Although particular embodiments of the invention have been described in detail, it is understood that the invention is not limited correspondingly in scope, but includes all changes, modifications and equivalents coming within the spirit and terms of the claims appended hereto.

What is claimed is:

1. An integrated module for an active antenna radiator assembly, the integrated module switchable between a receive mode and a transmit mode, the integrated module comprising a first amplifier to amplify signals to be transmitted by the radiator, a second amplifier to amplify signals received by the radiator, a dual input wideband balun, a transmit line coupled to an output of the first amplifier and the balun, a receive line coupled to an input of the second amplifier and the balun, a first MEMS switch to shunt the receive line to ground when the integrated module is placed in the transmit mode and a second MEMS switch to shunt the transmit line to ground when the integrated module is placed in the receive mode.

2. The radiator assembly according to claim 1, wherein the transmit and receive lines are microstrip lines disposed over the balun.

3. The radiator assembly according to claim 2, wherein the transmit and receive MEMS switches are shunt cantilever MEMS switches.

4. The radiator assembly according to claim 1, wherein the transmit and receive MEMS switches are shunt cantilever MEMS switches.

5. The radiator assembly according to claim 1, wherein the transmit and receive lines are co-planar wave guide (CPW) lines disposed in a plane of the balun.

6. The radiator assembly according to claim 5, wherein the transmit and receive MEMS switches are capacitive membrane MEMS switches.

7. The radiator assembly according to claim 1, wherein the transmit and receive MEMS switches are capacitive membrane MEMS switches.

8. The radiator assembly according to claim 1, wherein the transmit line is configured to act as a virtual short at the second switch when the integrated module is placed in the receive mode and the receive line is configured to act as a virtual short at the first switch when the integrated module is placed in the transmit mode.

9. The radiator assembly according to claim 1, wherein the balun has a first arm and a second arm spaced apart by a slot.

10. The radiator assembly according to claim 9, wherein the first arm is paired with a third arm to form a first "L" shaped structure and the second arm is paired with a fourth arm to form a second "L" shaped structure oppositely arranged with the first "L" shaped structure.

11. The radiator assembly according to claim 10, wherein each arm is a quarter wavelength section.

12. The radiator assembly according to claim 1, wherein the radiator is a wideband circular patch printed on a dielectric cylinder.

13. An active antenna radiator assembly, comprising:
a radiator; and
an integrated module disposed behind the radiator and switchable between a receive mode and a transmit mode, wherein the integrated module includes:
  a high power amplifier (HPA) for amplifying signals to be transmitted by the radiator;
  a low noise amplifier (LNA) for amplifying signals received by the radiator;
  a wideband balun having at least a first arm and a second arm, the arms respectively coupled to the radiator via a pair of probes that are 180 degrees out of phase with respect to the radiator;
  a receive line coupled to an input of the LNA and the balun;
  a transmit line coupled to an output of the HPA and the balun;
  a receive micro electromechanical system (MEMS) switch to selectively couple the receive line to ground when the integrated module is placed in the transmit mode; and
  a transmit MEMS switch to selectively couple the transmit line to ground when the integrated module is placed in the receive mode.

14. The radiator assembly according to claim 13, wherein the transmit and receive lines are microstrip lines disposed over the balun.

15. The radiator assembly according to claim 14, wherein the transmit and receive MEMS switches are shunt cantilever MEMS switches.

16. The radiator assembly according to claim 13, wherein the transmit and receive MEMS switches are shunt cantilever MEMS switches.

17. The radiator assembly according to claim 13, wherein the transmit and receive lines are co-planar wave guide (CPW) lines disposed in a plane of the balun.

18. The radiator assembly according to claim 17, wherein the transmit and receive MEMS switches are capacitive membrane MEMS switches.

19. The radiator assembly according to claim 13, wherein the transmit and receive MEMS switches are capacitive membrane MEMS switches.

20. The radiator assembly according to claim 13, wherein the radiator is a wideband dielectric cylindrical radiator.

21. The radiator assembly according to claim 13, wherein the transmit line is configured to act as a virtual short at the second switch when the integrated module is placed in the receive mode and the receive line is configured to act as a virtual short at the first switch when the integrated module is placed in the transmit mode.

22. The radiator assembly according to claim 13, wherein the first and second arms of the balun are spaced apart by a slot.

23. The radiator assembly according to claim 22, wherein the first arm is paired with a third arm to form a first "L" shaped structure and the second arm is paired with a fourth arm to form a second "L" shaped structure oppositely arranged with the first "L" shaped structure.

24. The radiator assembly according to claim 23, wherein each arm is a quarter wavelength section.

* * * * *